United States Patent [19]

Simbirdi

[11] 3,836,035

[45] Sept. 17, 1974

[54] PLUG DEVICE

[76] Inventor: Rashid I. Simbirdi, 1185 Elm St., San Carlos, Calif. 94070

[22] Filed: Jan. 24, 1973

[21] Appl. No.: 326,413

[52] U.S. Cl. .............................................. 220/24.5
[51] Int. Cl. .............................................. B65d 39/12
[58] Field of Search ........ 220/24.5; 215/52; 138/89, 138/92, 94

[56] References Cited
UNITED STATES PATENTS

| | | | |
|---|---|---|---|
| 778,638 | 12/1904 | Devaney | 220/24.5 |
| 2,277,885 | 3/1942 | Rodanet | 220/24.5 |
| 2,533,715 | 12/1950 | Conklin | 220/24.5 |
| 2,566,816 | 9/1951 | Work | 220/24.5 |
| 3,489,312 | 1/1970 | Hunckler et al. | 220/24.5 |

*Primary Examiner*—William I. Price
*Assistant Examiner*—Steven M. Pollard

[57] ABSTRACT

A plug device for closing the openings in tanks and other structures. This device consists primarily of an expandable resilient capsule with threaded shaft means and threaded flange nut means for working in conjunction with each other, to expand the resilient capsule in order that the opening of the tank or other structure will be tightly sealed.

3 Claims, 4 Drawing Figures

PATENTED SEP 17 1974　　　　　　　　　　3,836,035

PLUG DEVICE

This invention relates to closure devices and more particularly to a plug device for plugging apertures in various structures.

It is therefore the principal object of this invention to provide a plug device which will effectively provide an airtight seal for the apertures in tanks and the like.

Another object of this invention is to provide a plug device which will have an expandable rubber capsule body portion, the body portion carrying a screw shaft which when rotated will cause the expansion to take place and thus seal the opening within a tank or like structure.

Still another object of this invention is to provide a device of the type described of which the capsule will include on its interior an internally threaded flange nut, the nut being embedded within the resilient material of the capsule.

Yet another object of this invention is to provide a device of the type described which will have an external appendage which will serve to rotate the threaded shaft portion, so as to effect the expansion of the resilient capsule, so as to close the aperture air and liquid tight.

Other objects of the invention are to provide a plug device which will be simple in design, inexpensive to manufacture, rugged in construction, easy to use and efficient in operation.

These and other objects will become readily evident upon a study of the following specification together with the accompanying drawing wherein.

Figure 1:
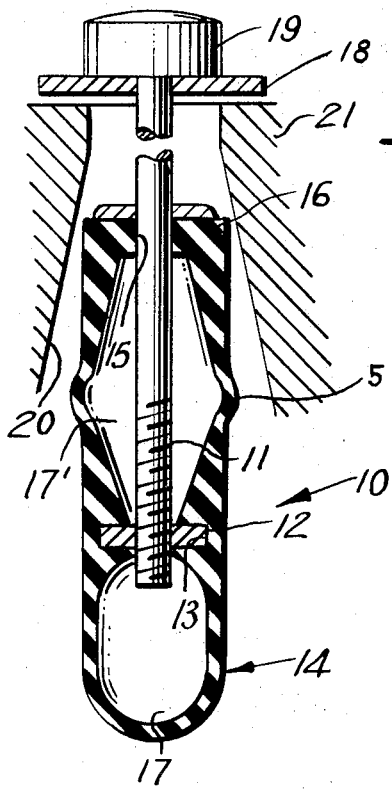
FIG. 1 is a vertical view of the present invention shown in elevation and in section.

According to this invention, a plug device 10 is shown to include a partially threaded shaft 11 which is threaded into a metal flange nut fastener 12 carried within an annular groove 13 of an elongated resilient capsule 14. The capsule 14 is molded to have an annular concave recess in its cavity 17' coinciding with an annular bulge 5 so that the wall structure of said cavity at this particular section has a convexo-concave profile. The smooth end of shaft 11 is carried within opening 15 of the end wall 16 of capsule 14. A pair of separated compartments 17 and 17' within capsule 14 are provided for a purpose which hereinafter will be described. The smooth end of shaft 11 is provided with a metal flange 18 which is positioned below the head portion 19 which terminates the unthreaded end of shaft 11.

The compartment portion 17 within capsule 14 enables the threaded end of shaft 11 to freely travel when the head portion 19 of shaft 11 is rotated so as to seal the opening 20 of structure 21.

The rotatable shaft 11 serves as a means for upward advancement of metal flange nut 12 which effects axial compression on capsule 14, resulting in a failure-proof outward creasing and expansion of its wall structure at the convexo-concave bulge 5 to thus seal against the inner periphery of opening 20 of structure 21.

It shall be noted that when closure is desired of opening 20, the portion defined by compartment 17' will expand outwards to thus seal against the inner periphery of the opening 20 of structure 21.

Figure 2:
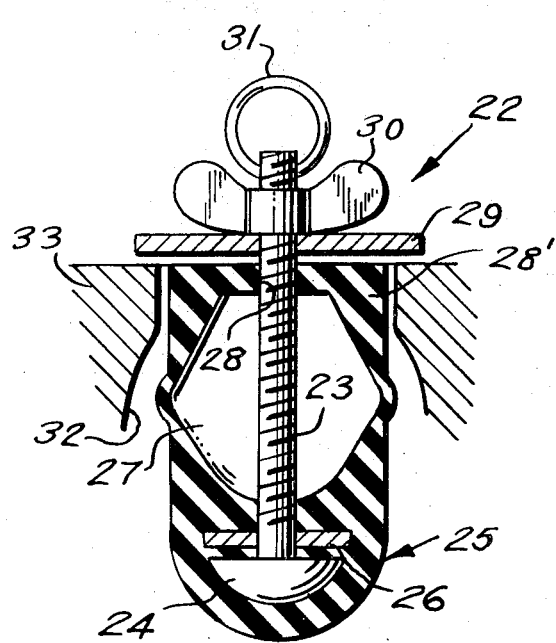
FIG. 2 is a vertical view similar to FIG. 1, but showing a modified form of the invention.

Referring now more particularly to FIG. 2 of the drawing, one will see a modified plug device 22 having a central anchor bolt 23, the head 24 of which is embedded in the rounded end of capsule 25. A re-enforcement flange 26 is also carried within the rounded end portion of capsule 25. A compartment 27 within resilient capsule 25 serves as a means for enabling the immediate wall structure to expand in a manner which hereinafter will be described. The anchor bolt 23 extends through the opening 28 of end wall 28' of capsule 25 and a flange 29 of metallic material is carried by anchor bolt 23. A winged nut fastener 30 is threadably carried by bolt fastener 23 and serves as a means for causing the capsule 25 to expand within the opening 32 of the tank or other structure 33. The external end of anchor bolt fastener 23 is provided with a ring 31 for easily gripping device 22, and/or suspending it from a wall fastener when not in use.

Figure 4:
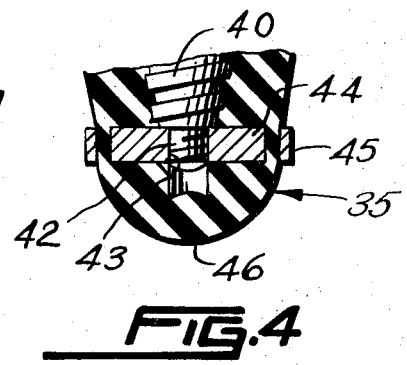
FIG. 4 is a fragmentary view of FIG. 3 showing the threaded portion of the stem engaged with the flanged nut of the device.
Figure 3:
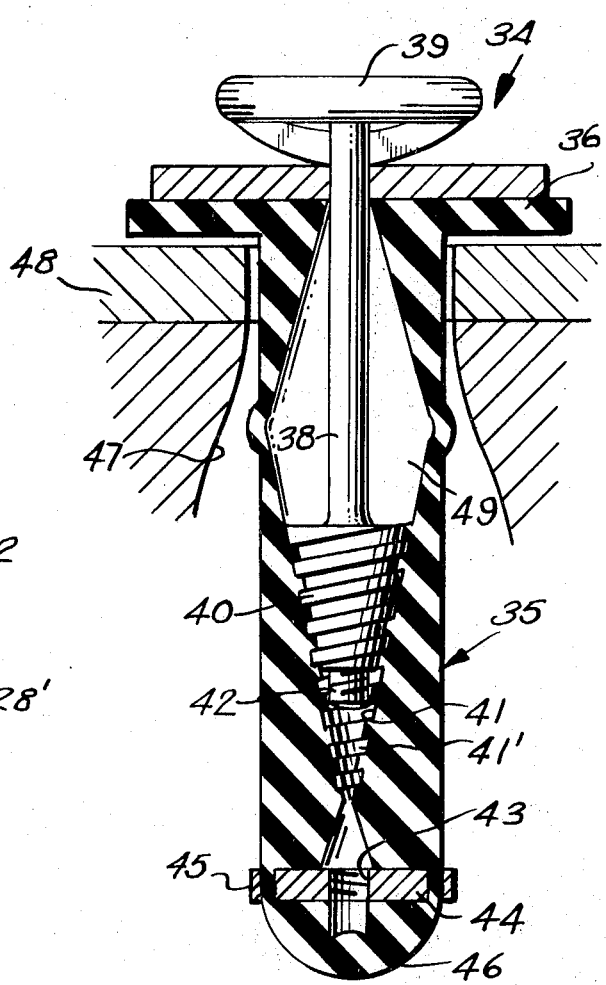
FIG. 3 is a similar view to FIG. 2, but shows a more refined and improved form of the invention.

Referring now to FIGS. 3 and 4 of the drawing, one will see a preferred embodiment 34 which includes a resilient capsule 35 having an upper flange 36 which abuts with a pressure flange 37. A central shaft 38 includes a hand-wheel 39 for the rotation thereof and one end is provided with a conically configurated screw 40 which engages threads 41 within a frusto-conical opening 41'. A threaded extension 42 of screw 40 is provided upon shaft 38, for being threadably received within opening 43 of a flange nut 44 within capsule 35. The area of the flange nut 44 is re-enforced by means of an external metal band 45 which frictionally engages the outer periphery of capsule 35. The flange nut 44 is embedded within the rounded end 46 of capsule 35.

In use, when the device 34 is inserted into the opening 47 of the structure 48, the hand-wheel 39 is rotated which will cause the conically configurated screw 40 to advance upon the threads 41 of capsule 35 thus resulting in the upper structure defined by the compartment 49, expanding to close the opening 47, the extension 42 of screw 40 providing for further engagement of shaft 38 with the opening 43 of the flange nut 44, thus effecting a complete air and liquid tight seal for the opening 47 of structure 48.

What I now claim is:

1. A plug device comprising a resilient capsule having a wall structure, said wall structure surrounding a cavity, said capsule being molded to have an annular bulge coinciding with an annular concave section of the capsule wall, a shaft, having a threaded end, carried within said cavity, means cooperating with said shaft to provide outward creasing and expansion to the convexo-concave section of the capsule wall structure.

2. The plug device of claim 1, wherein said means include a head for said shaft embedded in a rounded end of said capsule and a wing nut carried on the threaded end of said shaft to provide the outward expansion of convexo-concave section of the capsule wall structure.

3. The plug device of claim 1, wherein said capsule includes an integral flange with an axial aperture, said means including a metal flange nut embedded in a round end of said capsule, and said shaft having a conical screw, said means further including a conically threaded compartment of said capsule to receive said screw and to expand the capsule wall structure.

* * * * *